(12) United States Patent
Wang et al.

(10) Patent No.: US 11,663,160 B2
(45) Date of Patent: May 30, 2023

(54) RECOVERING THE METADATA OF DATA BACKED UP IN CLOUD OBJECT STORAGE

(71) Applicant: VMware, Inc., Palo Alto, CA (US)

(72) Inventors: Wenguang Wang, Santa Clara, CA (US); Vamsi Gunturu, Cupertino, CA (US); Junlong Gao, Santa Clara, CA (US); Petr Vandrovec, Cupertino, CA (US); Ilya Languev, Santa Cruz, CA (US); Maxime Austruy, Lausanne (CH); Ilia Sokolinski, Boston, MA (US); Satish Pudi, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 157 days.

(21) Appl. No.: 17/002,669

(22) Filed: Aug. 25, 2020

(65) Prior Publication Data

US 2022/0066883 A1  Mar. 3, 2022

(51) Int. Cl.
| | |
|---|---|
| *G06F 16/11* | (2019.01) |
| *G06F 16/27* | (2019.01) |
| *G06F 16/20* | (2019.01) |
| *G06F 16/25* | (2019.01) |
| *G06F 11/14* | (2006.01) |
| *H04L 67/1097* | (2022.01) |

(52) U.S. Cl.
CPC ........ *G06F 16/128* (2019.01); *G06F 11/1471* (2013.01); *G06F 16/20* (2019.01); *G06F 16/273* (2019.01); *H04L 67/1097* (2013.01); *G06F 11/1451* (2013.01); *G06F 16/258* (2019.01); *G06F 2201/80* (2013.01); *G06F 2201/84* (2013.01)

(58) Field of Classification Search
CPC ...... G06F 16/128; G06F 16/273; G06F 16/20; G06F 11/1471; G06F 16/258; G06F 11/1451; G06F 2201/80; G06F 2201/84; H04L 67/1097
See application file for complete search history.

(56) References Cited

U.S. PATENT DOCUMENTS

| | | | |
|---|---|---|---|
| 11,048,590 B1 * | 6/2021 | Sapuntzakis | G06F 11/1448 |
| 11,119,862 B2 * | 9/2021 | Dewey | G06F 3/065 |
| 11,151,082 B1 * | 10/2021 | Chheda | G06F 16/182 |
| 2018/0150499 A1 * | 5/2018 | Lee | G06F 11/2038 |
| 2019/0138386 A1 * | 5/2019 | Konduru | G06F 3/0608 |
| 2020/0019620 A1 * | 1/2020 | Sarda | G06F 3/0608 |
| 2020/0034052 A1 * | 1/2020 | Mukku | G06F 12/10 |
| 2020/0134041 A1 * | 4/2020 | Lu | G06F 16/122 |

(Continued)

*Primary Examiner* — Alicia M Willoughby (57) ABSTRACT

In one set of embodiments, a computer system can create a snapshot of a data set, where the snapshot includes a plurality of data blocks of the data set. The computer system can upload the snapshot to a cloud object storage platform of a cloud infrastructure, where the snapshot is uploaded as a plurality of log segments conforming to an object format of the cloud object storage platform, and where each log segment includes one or more data blocks in the plurality of data blocks, and a set of metadata comprising, for each of the one or more data blocks, an identifier of the data set, an identifier of the snapshot, and a logical block address (LBA) of the data block. The computer system can then communicate the set of metadata to a server component running in a cloud compute and block storage platform of the cloud infrastructure.

21 Claims, 9 Drawing Sheets

(56) References Cited

U.S. PATENT DOCUMENTS

2020/0167238 A1* 5/2020 Killamsetti ......... G06F 11/1461
2021/0034571 A1* 2/2021 Bedadala .............. G06F 16/134
2021/0097022 A1* 4/2021 Kumar ................... G06F 3/065
2021/0103554 A1* 4/2021 Alluboyina ........... G06F 3/0604

* cited by examiner

RECOVERING THE METADATA OF DATA BACKED UP IN CLOUD OBJECT STORAGE

BACKGROUND

Object storage is a data storage model that manages data in the form of logical containers known as objects, rather than in the form of files (as in file storage) or blocks (as in block storage). Cloud object storage is an implementation of object storage that maintains these objects on a cloud infrastructure, which is a server infrastructure that is accessible via the Internet. Due to its high scalability, high durability, and relatively low cost, cloud object storage is commonly used by companies to backup large volumes of data for disaster recovery and long-term retention/archival. The software systems that are employed to create and manage these backups are referred to herein as cloud object storage-based data backup (COS-DB) systems.

In some COS-DB systems, the process of backing up a data set to a cloud object storage platform involves (1) uploading incremental point-in-time versions (i.e., snapshots) of the data set to the cloud object storage platform and (2) uploading associated metadata (which identifies, among other things, the storage objects (e.g., "log segments") used to hold the data of each snapshot) to a separate cloud block storage platform. By maintaining snapshot data and metadata in these two different storage platforms (and via different types of data structures), a COS-DB system can more efficiently execute certain snapshot management operations.

However, cloud block storage generally offers lower durability than cloud object storage, which makes the metadata stored in cloud block storage more vulnerable to data loss. For example, in case of Amazon's AWS cloud infrastructure, its cloud block storage platform (i.e., Elastic Block Store (EBS)) guarantees approximately "three nines" of durability, which means there is a 0.01% chance that a customer will lose an EBS volume within a single year. In contrast, Amazon's cloud object storage platform (i.e., Simple Storage Service (S3)) guarantees "eleven nines" of durability, which means there is only a 0.000000001% chance that a customer will lose an S3 object in a single year.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques that can be implemented by a COS-DB system for recovering metadata associated with data backed up in a cloud object storage platform. In one set of embodiments, the COS-DB system can upload, as a series of log segments, a snapshot of the data set to the cloud object storage platform, where each log segment in the series includes one or more data blocks in the snapshot and a first set of metadata usable to generate mappings between the one or more data blocks and the log segment. For example, this first set of metadata can include, for each data block in the log segment, a identifier (ID) of the data set, an identifier of the snapshot, and a logical block address (LBA) of the data block. In addition, as part of the snapshot upload process, the COS-DB system can (1) populate the mappings between data blocks and log segments in a first metadata database maintained in a cloud block storage platform, (2) populate a second set of metadata pertaining to the snapshot in a second metadata database in the cloud block storage platform, and (3) using a hybrid "asynchronous/synchronous" approach, replicate a transaction log of the second metadata database to a remote site.

Then, at the time of a failure in the cloud block storage platform that causes the first metadata database to be "lost" (e.g., corrupted, deleted, or otherwise unreadable), the COS-DB system can carry out a recovery process that involves reading the log segments in the cloud object storage platform, extracting the first set of metadata included in each log segment, and rebuilding the contents of the first metadata database using the extracted information. Further, at the time of a failure in the cloud block storage platform that causes the second metadata database to be lost, the COS-DB system can carry out a recovery process that involves retrieving the replicated transaction log from the remote site and rebuilding the contents of the second metadata database using the retrieved transaction log.

The foregoing and other aspects of the present disclosure are described in further detail below.

2. Operating Environment and COS-DB System Architecture

Figure 1:
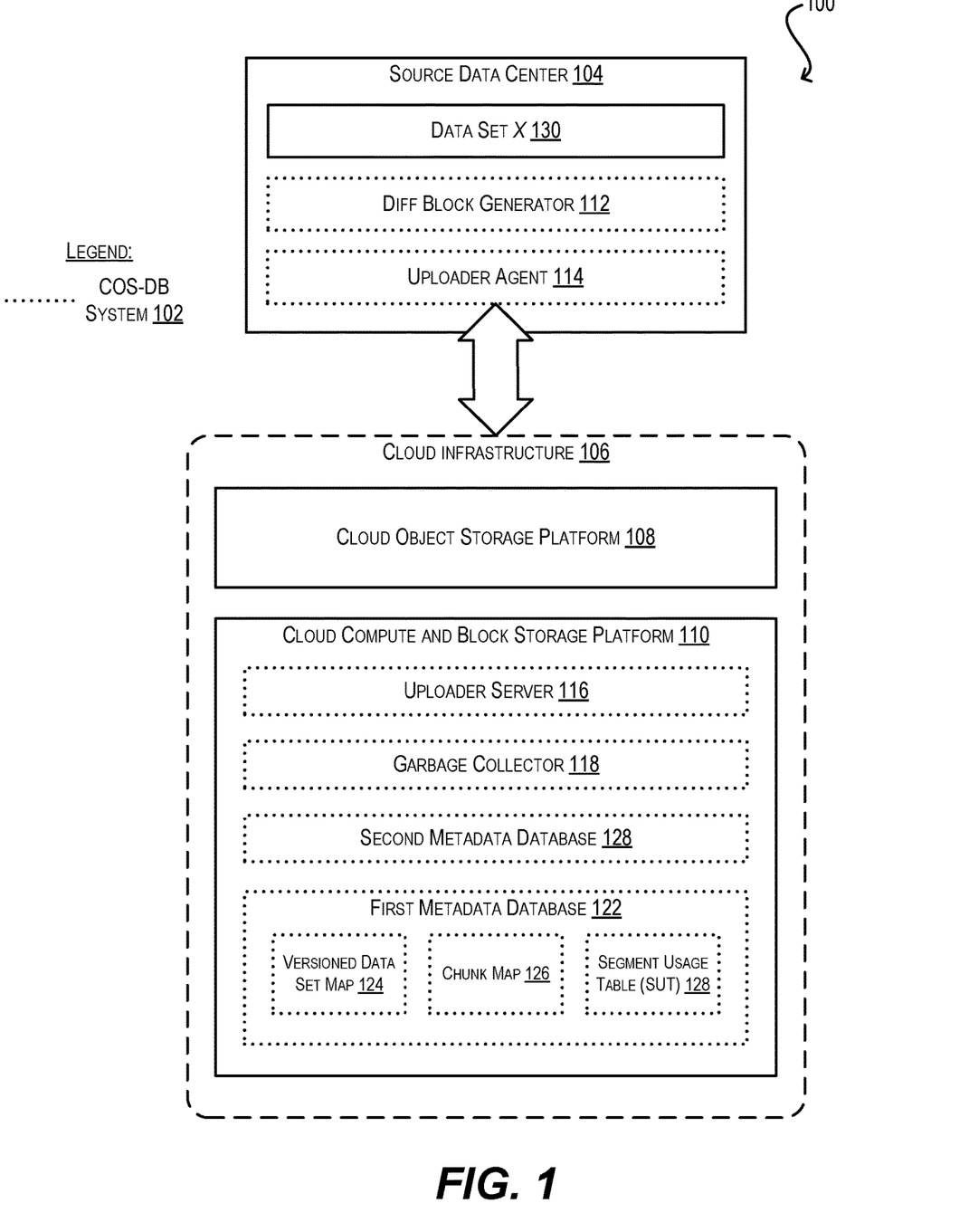
FIG. 1 depicts an operating environment and example cloud object storage-based data backup (COS-DB) system according to certain embodiments.

FIG. 1 depicts an operating environment 100 and an example COS-DB system 102 in which embodiments of the present disclosure may be implemented. As shown, operating environment 100 includes a source data center 104 that is communicatively coupled with a cloud infrastructure 106 comprising a cloud object storage platform 108 and a cloud compute and block storage platform 110. Examples of cloud object storage platform 108 include Amazon S3, Microsoft Azure Blob Storage, and Google Cloud Storage. Examples of cloud compute and block storage platform 110 include Amazon Elastic Compute Cloud (EC2) and Elastic Block Store (EBS), Microsoft Azure Virtual Machines (VMs) and Managed Disks (MDs), and Google Compute Engine (CE) and Persistent Disks (PDs).

COS-DB system 102—whose components are depicted via dotted lines—includes a diff block generator 112 and uploader agent 114 in source data center 104 and an uploader server 116, a garbage collector 118, a first metadata database 120 (comprising a versioned data set map 122, a chunk map 124, and a segment usage table (SUT) 126), and a second metadata database 128 in cloud compute and block storage platform 110. The primary objective of COS-DB system 102 is to backup, on an ongoing basis, a data set X (reference numeral 130) maintained at source data center 104 to cloud object storage platform 108 for disaster recovery, long-term retention, and/or other purposes. Data set X may be, e.g., a virtual disk file, a Kubernetes persistent volume, a virtual storage area network (vSAN) object, or any other logical collection of data. The following sub-sections provide brief descriptions of components 112-128 and how they enable COS-DB system 102 system to achieve this objective.

2.1 Diff Block Generator, Uploader Agent, and Uploader Server

Figure 2:
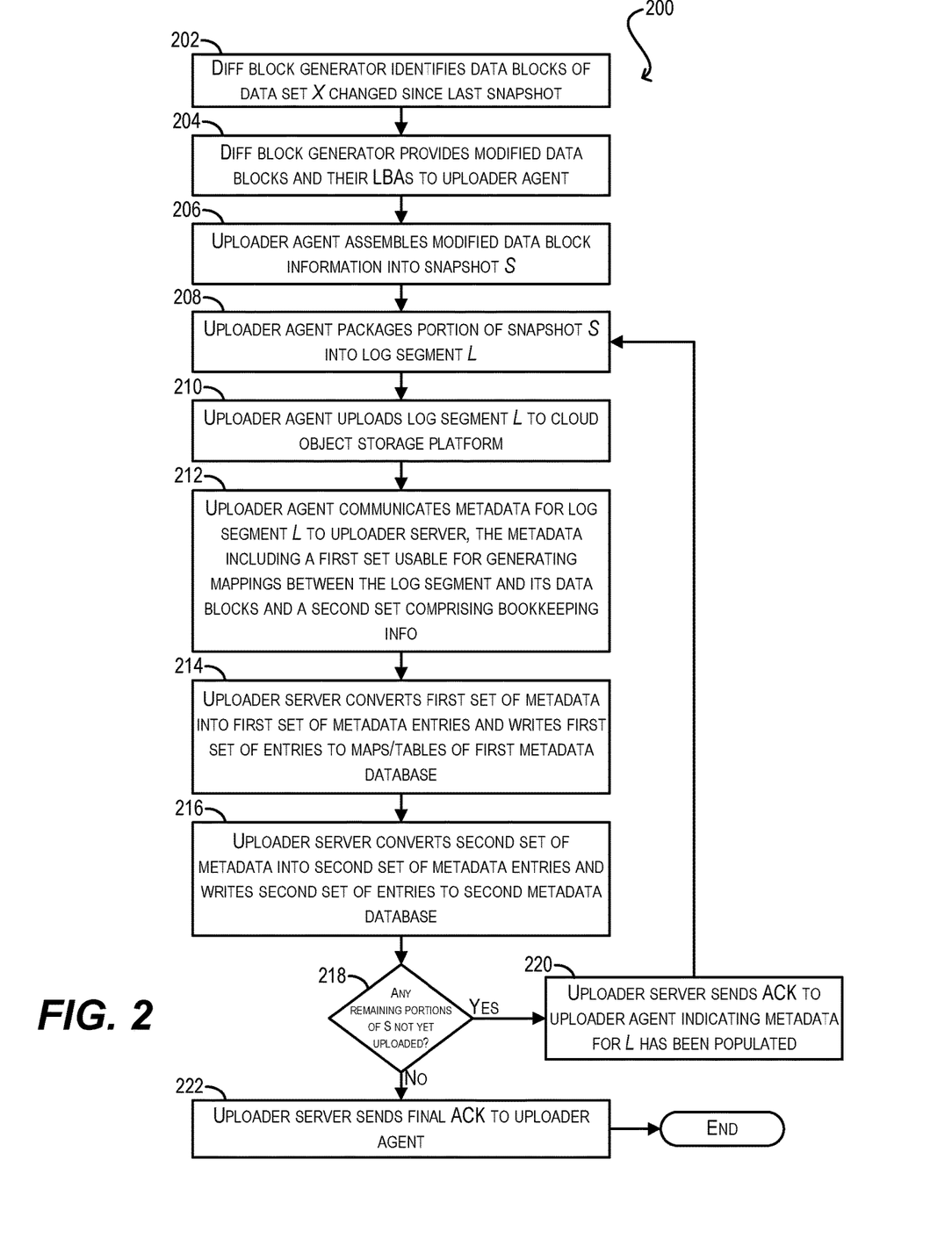
FIG. 2 depicts a snapshot upload workflow according to certain embodiments.

Diff block generator 112, uploader agent 114, and uploader server 116 are components of COS-DB system 102 that work in concert to upload snapshots of data set X from source data center 104 to cloud object storage platform 108, thereby backing up data set X in platform 108. FIG. 2 depicts a workflow 200 that can be executed by components 112-116 for uploading a given snapshot S of X to platform 108 according to certain embodiments.

Starting with steps 202 and 204, diff block generator 112 can identify data blocks in data set X that have changed since the creation/upload of the last snapshot for X and can provide these modified data blocks, along with their logical block addresses (LBAs), to uploader agent 114. In the case where no snapshot has previously been created/uploaded for data set X, diff block generator 112 can provide all data blocks of X to uploader agent 114 at step 204.

At step 206, uploader agent 114 can receive the data block information from diff block generator 112 and assemble it into a snapshot S composed of, e.g., <LBA, data block> tuples. Uploader agent 114 can then take a portion of snapshot S that fits into a fixed-size data object conforming to the object format of cloud object storage platform 108 (referred to herein as a "log segment"), package that portion into a log segment L (step 208), and upload (i.e., write) log segment L to cloud object storage platform 108 (step 210). As suggested by the name "log segment," uploader agent 114 performs the upload of these segments in a log-structured manner, such that they do not overwrite existing log segments which contain data for overlapping LBAs of data set X Stated another way, uploader agent 114 uploads/writes every log segment as an entirely new object in cloud object storage platform 108, regardless of whether it includes LBAs that overlap previously uploaded/written log segments.

Upon (or concurrently with) uploading log segment L at step 210, uploader agent 114 can communicate metadata pertaining to L to uploader server 116 (step 212). This metadata can include a first set of metadata that is usable to generate mappings between the snapshot data blocks included in L and L itself (e.g., an ID of data set X, an ID of snapshot S, the LBA of each data block, an ID of log segment L, etc.) and a second set of metadata comprising certain bookkeeping information (e.g., user authentication information, upload timestamp of L, etc.). In response, uploader server 116 can convert the first set of metadata into a first set of metadata entries that conform to the schemas of versioned data set map 122, chunk map 124, and SUT 126 and can write the first set of entries to these maps/tables (step 214). Uploader server 116 can also convert the second set of metadata into a second set of metadata entries that conform to the schema of second metadata database 128 and write the second set of entries to database 128 (step 216).

At step 218, uploader server 116 can check whether there are any remaining portions of snapshot S that have not yet been uploaded. If the answer is yes, uploader server 116 can return an acknowledgement to uploader agent 114 that metadata databases 120 and 128 have been updated with the metadata for log segment L (step 220), thereby causing workflow 200 to return to step 208 (so that uploader agent 114 can package the next portion of S into a new log segment for uploading).

However, if the answer at step 218 is no, uploader server 116 can return a final acknowledgement to uploader agent 114 indicating that the upload of snapshot S and all of its metadata is complete (step 222) and workflow 200 can end.

Figure 3A:
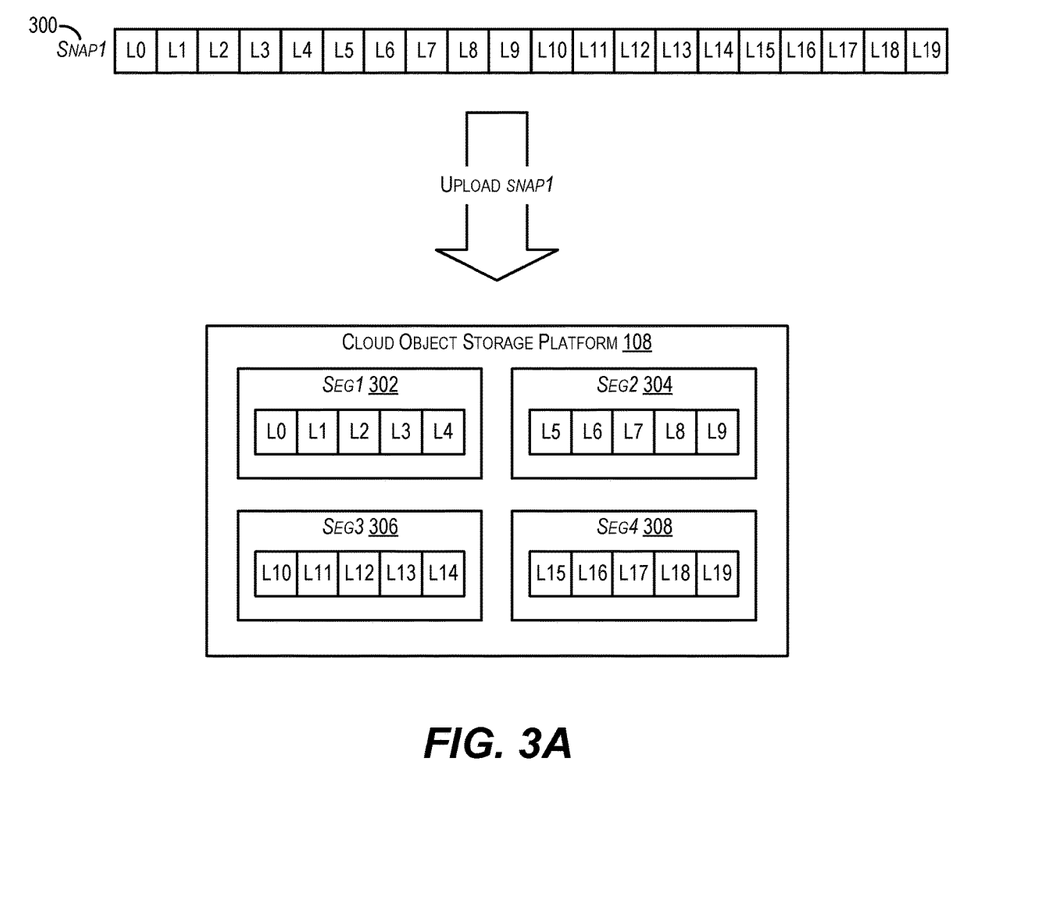
FIGS. 3A, 3B, and 3C depict example snapshot upload scenarios.
Figure 3B:
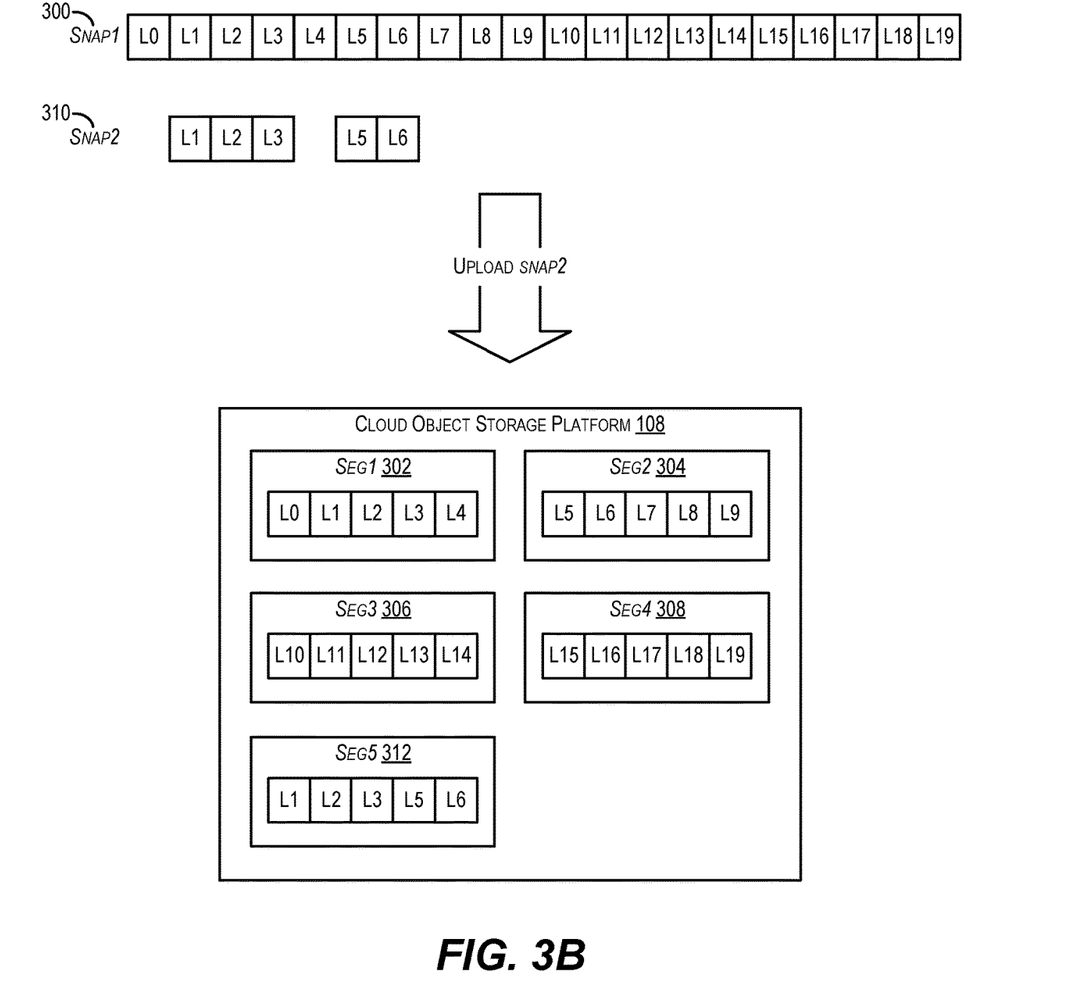
Figure 3C:
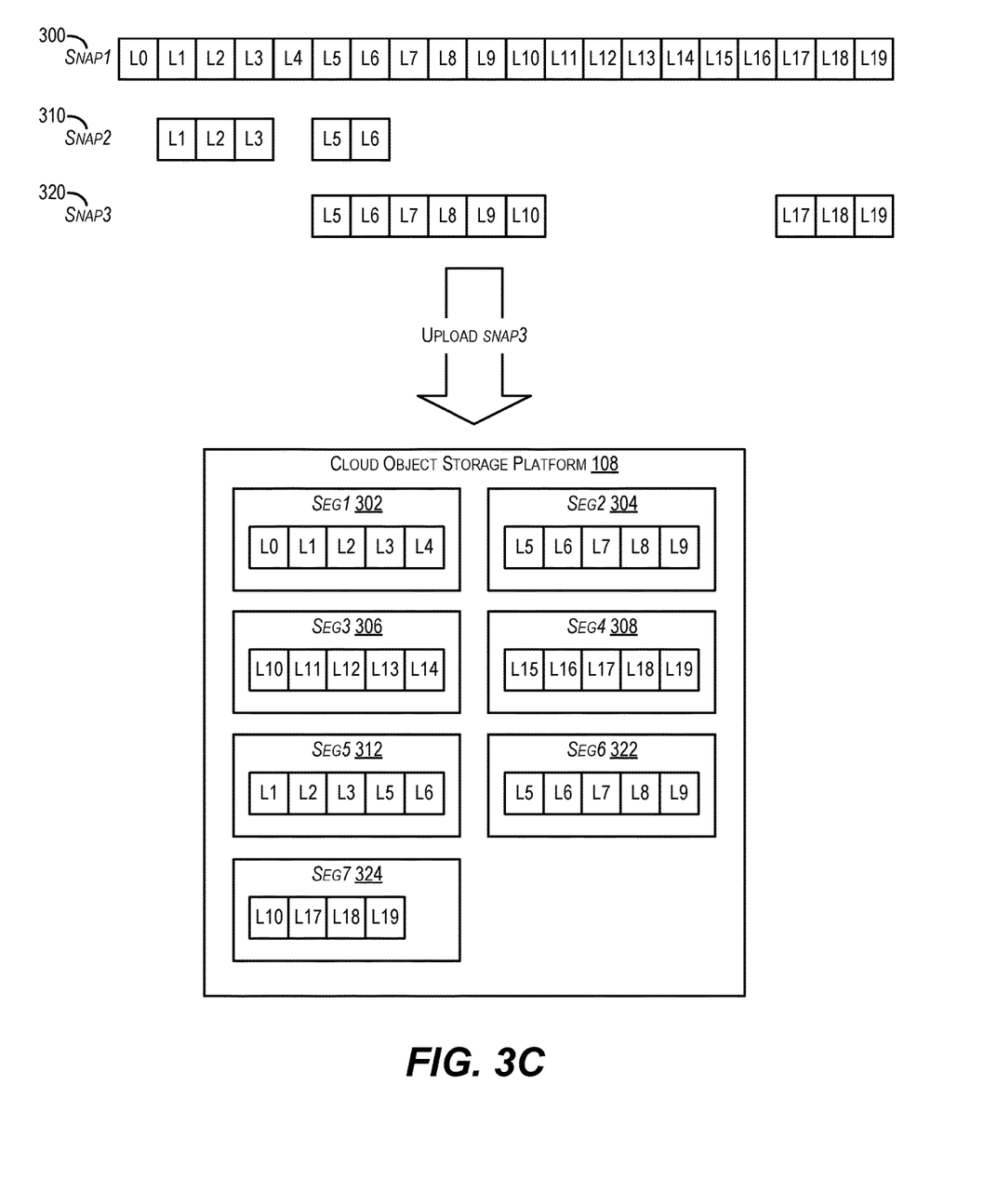

To clarify the foregoing, FIGS. 3A, 3B, and 3C depict three example snapshots of data set X (i.e., snap1 (reference numeral 300), snap2 (reference numeral 310), and snap3 (reference numeral 320)) that may be uploaded to cloud object storage platform 108 in accordance with workflow 200 and the log segments that may be created in platform 108 per step 210 of the workflow. As shown in FIG. 3A, snapshot snap1 includes twenty data blocks having LBAs L0-L19 and the upload of this snapshot creates four log segments in cloud object storage platform 108 (assuming a max segment size of five data blocks): seg1 (reference numeral 302) comprising data blocks L0-L4 of snap1, seg2 (reference numeral 304) comprising data blocks L5-L9 of snap1, seg3 (reference numeral 306) comprising data blocks L10-L14 of snap1, and seg4 (reference numeral 308) comprising data blocks L15-L19 of snap1.

Further, as shown in FIG. 3B, snapshot snap2 includes five data blocks L1-L3, L5, and L6 (which represent the content of data set X that has changed since snap1) and the upload of snap2 creates one additional log segment in cloud object storage platform 108: seg5 (reference numeral 312) comprising data blocks L1-L3, L5, and L6 of snap2. Note that the prior versions of data blocks L1-L3, L5, and L6 associated with snap1 and included in existing log segments seg1 and seg2 are not overwritten by the upload of snap2; however, these prior data block versions are considered "superseded" by snap2 because they no longer reflect the current data content of LBAs L1-L3, L5, and L6.

Yet further, as shown in FIG. 3C, snapshot snap3 includes nine data blocks L5-L10 and L17-L19 (which represent the content of data set X that has changed since snap2) and the upload of snap3 creates two additional log segments in cloud object storage platform 108: seg6 (reference numeral 322) comprising data blocks L5-L9 of snap3 and seg7 (reference numeral 324) comprising data blocks L10 and L17-L19 of snap3. Like the scenario of snap2, the prior versions of data blocks L5-L10 and L17-L19 remain in their existing log segments but are considered superseded by the new versions associated with snap3.

As a supplement to FIGS. 3A-3C, listings 1-3 below present example metadata entries that may be populated by uploader server 116 in version data set map 122, chunk map 124, and SUT 126 respectively (per step 214 of workflow 200) as a result of the uploading of snap1, snap2, and snap3:

<X, snap1, L0>→<C1, N20>
    <X, snap2, L1>→<C21, N3>
    <X, snap2, L5>→<C24, N2>
    <X, snap3, L5>→<C26, N6>
    <X, snap3, L17>→<C32, N3>

Listing 1: Metadata Populated in Version Data Set Map

C1<→seg1, N5>
    C6<→seg2, N5>
    C11<→seg3, N5>
    C16<→seg4, N5>
    C21<→seg5, N3>
    C24<→seg5, N2>

C26<↔seg6, N5>
C31<↔seg7, N1>
C32<↔seg7, N3>

Listing 2: Metadata Populated in Chunk Map seg1→<LIVE5, TOTAL5>
seg2→<LIVE5, TOTAL5>
seg3→<LIVE5, TOTAL5>
seg4→<LIVE5, TOTAL5>
seg5→<LIVE5, TOTAL5>
seg6→<LIVE5, TOTAL5>
seg7→<LIVE4, TOTAL4>

Listing 3: Metadata Populated in Segment Usage Table

Regarding listings 1 and 2, the metadata entries presented here can be understood as mapping the data blocks/LBAs of snap1, snap2, and snap3 (which are all different versions of data set X) to the log segments in which they are stored (i.e., seg1-seg7) per FIGS. 3A-3C. The particular schema employed by these metadata entries comprises a first mapping between each snapshot data block LBA and a "chunk ID" (e.g., C1) via versioned data set map 122 and a second mapping between each chunk ID and a log segment ID (e.g., seg1) via chunk map 124. This schema provides a level of indirection between the snapshot data blocks and their log segment locations, which allows for more efficient implementation of certain features in COS-DB system 102 such as data deduplication. In alternative embodiments, the chunk ID attribute can be removed and each snapshot data block LBA can be directly mapped to its corresponding log segment ID.

Further, the metadata entries presented in listings 1 and 2 make use of a range value (i.e., "N20", "N5," etc.) that effectively compresses multiple consecutive metadata entries in maps 122 and 124 into a single entry. For example, the first metadata entry shown in listing 1 (i.e., <X, snap1, L0>→<C1, N20>) includes the range value "N20," which indicates that this entry actually represents twenty metadata entries in versioned data set map 122 with sequentially increasing LBAs and chunk IDs as shown below:

<X, snap1, L0>→C1
<X, snap1, L1>→C2
. . .
<X, snap1, L19>→C20

Listing 4

Similarly, the first metadata entry shown in listing 2 (i.e., C1<↔seg1, N5>) includes the range value "N5," which indicates that this entry actually represents five metadata entries in chunk map 124 with sequentially increasing chunk IDs as shown below:

C1→seg1
C2→seg1
C3→seg1
C4→seg1
C5→seg1

Listing 5

Regarding listing 3, the metadata entries presented here indicate the number of live data blocks and total data blocks included each log segment seg1-seg7 shown in FIGS. 3A-3C. As used herein, a "live" data block is one that is currently a part of, or referenced by, an existing (i.e., non-deleted) snapshot in cloud object storage platform 108. Thus, for example, seg1 has five live data blocks because it includes data blocks L0-L4 of snap1, which is an existing snapshot in platform 108 per the upload operation depicted in FIG. 3A. Conversely, a "dead" data block is one that is not currently a part of, or referenced by, an existing snapshot in cloud object storage platform 108 (and thus can be deleted). The significance of this live/dead distinction is discussed with respect to garbage collector 118 below.

2.2 Garbage Collector

One consequence of deleting a snapshot from cloud object storage platform 108 that has been uploaded in accordance with workflow 200 of FIG. 2 is that the deletion can result in dead data blocks in certain log segments. As noted above, a dead data block is one that is not part of, or referenced by, any existing (i.e., non-deleted) snapshot in cloud object storage platform 108, and thus should ideally be deleted to free the storage space it consumes.

To understand this phenomenon, consider the scenarios shown in FIGS. 3A-3C where snapshots snap1-snap3 of data set X are sequentially uploaded to cloud object storage platform 108. Assume that after the upload of snap3, snap1 is deleted from platform 108. In this case, data blocks L1-L3, L5-L10, and L17-L19 of snap1 in log segments seg1-seg4 are rendered dead because, while they are still stored in cloud object storage platform 108 via these log segments, their corresponding snapshot snap1 is now gone/deleted and these data blocks will never be referenced by another, later snapshot (by virtue of being superseded by the new versions of these data blocks in snap2 and snap3). Accordingly, these dead data blocks in seg1-seg4 are unnecessarily consuming storage space and should be deleted.

Figure 4:
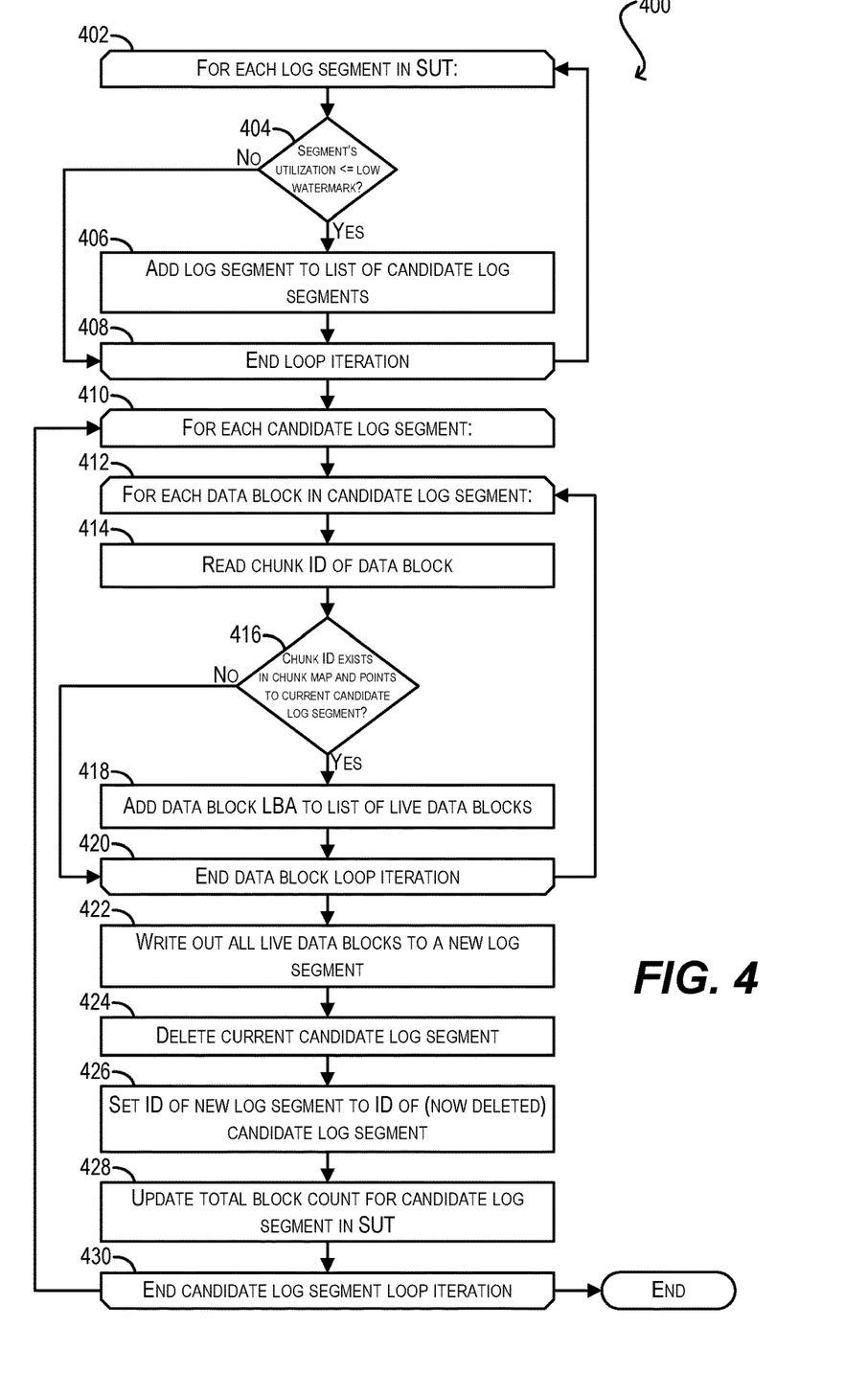
FIG. 4 depicts a garbage collection workflow according to certain embodiments.

To handle the foregoing and other similar scenarios, garbage collector 118 of COS-DB system 102 can periodically carry out a garbage collection (also known as "segment cleaning") process to identify and delete dead data blocks from the log segments maintained in cloud object storage platform 108. FIG. 4 depicts a workflow 400 of this garbage collection process according to certain embodiments. Workflow 400 assumes that, at the time a given snapshot is deleted from cloud object storage platform 108, the metadata entries mapping the data blocks of that snapshot to their corresponding log segments are removed from versioned data set map 122 and chunk map 124. Workflow 400 also assumes that the SUT entries of the affected segments in SUT 126 are updated to reflect an appropriately reduced live data block count for those log segments.

Starting with steps 402 and 404, garbage collector 118 can enter a loop for each log segment in SUT 126 and determine, from the log segment's SUT entry, whether the log segment's "utilization rate" (i.e., its number of live data blocks divided by its number of total data blocks) is less than or equal to some low watermark (e.g., 50%). If the answer is yes, garbage collector 118 can add that log segment to a list of "candidate" log segments that will be garbage collected (step 406). If the answer is no, garbage collector 118 can take no action. Garbage collector 118 can then reach the end of the current loop iteration (step 408) and repeat the foregoing steps for each additional log segment in SUT 126.

Once all log segments have been processed, garbage collector 118 can enter a loop for each candidate log segment identified per step 406 (step 410) and another loop for each data block of the candidate log segment (step 412). Within the data block loop, garbage collector 118 can read the chunk ID of the data block (step 414) and check whether the data block's chunk ID exists in chunk map 124 and points to the current candidate log segment within the chunk map (step 416). If the answer is yes, garbage collector 118 can conclude that the current data block is a live data block and add the data block's LBA to a list of live data blocks (step 418). On the other hand, if the answer at step 416 is no, garbage collector 118 can conclude that the current data block is a dead data block and take no action. Garbage collector 118 can then reach the end of the current iteration for the data block loop (step 420) and repeat steps 412-420 until all data blocks within the current candidate log segment have been processed.

At steps 422-426, garbage collector 118 can write out all of the live data blocks identified for the current candidate log segment (per step 418) to a new log segment, delete the current candidate log segment, and set the ID of the new log segment created at block 422 to the ID of the (now deleted) current candidate log segment, thereby effectively "shrinking" the current candidate log segment to include only its live data blocks (and exclude the dead data blocks). Garbage collector 118 can also update the total data block count for the current candidate log segment in SUT 126 accordingly (step 428).

Finally, at step 430, garbage collector 118 can reach the end of the current iteration of the candidate log segment loop and repeat steps 410-430 for the next candidate log segment. Once all candidate log segments have been processed, workflow 400 can end.

3. High-Level Solution Description

As mentioned in the Background section, by separating out the storage of data snapshots and their associated metadata into two different cloud storage locations with different data structures—namely, the storage of data snapshots in the form of log segments in cloud object storage platform 108 and the storage of snapshot metadata in the form of databases 120 and 128 in cloud compute/block storage platform 110—COS-DB system 102 can more efficiently execute certain snapshot management operations. However, because cloud compute/block storage platform 110 typically provides a lower degree of durability than cloud object storage platform 108, this configuration can lead to a scenario in which the metadata of the snapshots of data set X becomes lost (due to, e.g., a failure in platform 110 that causes metadata databases 120 and 128 to become unreadable), while the data content of the snapshots remain accessible via cloud object storage platform 108. If metadata databases 120 and 128 cannot be rebuilt/recovered in this scenario, the snapshots will be rendered unusable (as the metadata needed to understand the structure and organization of the snapshots will be gone).

Figure 5:
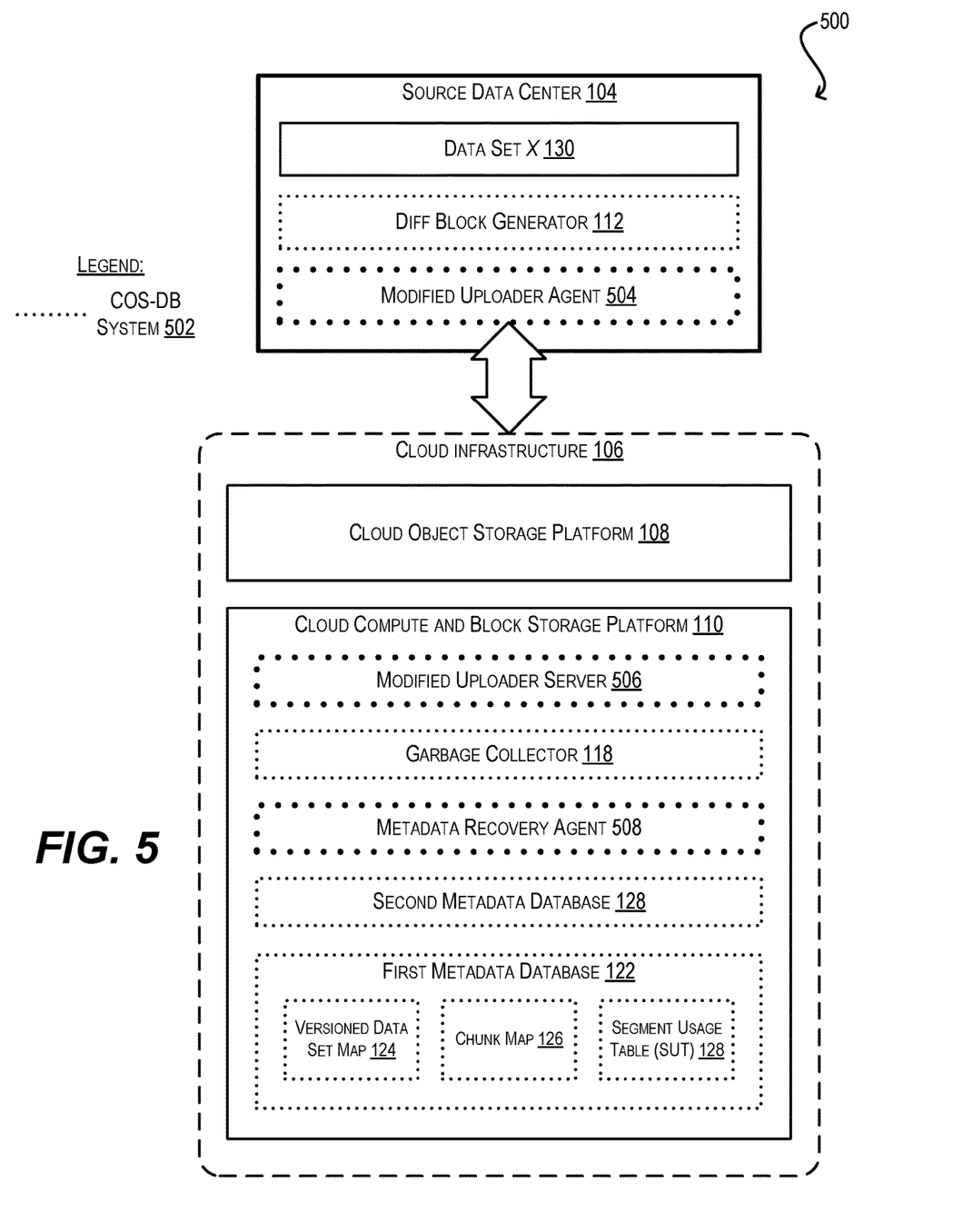
FIG. 5 depicts an enhanced version of the COS-DB system of FIG. 1 according to certain embodiments.

To address the foregoing and other similar issues, FIG. 5 depicts a system environment 500 comprising an enhanced version of COS-DB system 102 of FIG. 1 (i.e., COS-DB system 502) that includes a modified uploader agent 504, a modified uploader server 506, and a novel metadata recovery agent 508. In the example of FIG. 5, metadata recovery agent 508 is shown as running on cloud compute and block storage platform 110; however, in alternative embodiments metadata recovery agent 508 may run at other locations/systems, such as at source data center 104 or some other component/platform of cloud infrastructure 106.

At a high level, uploader agent 504 and uploader server 506 can carry out an enhanced snapshot upload process that involves (1) including, by uploader agent 504 in each log segment uploaded to cloud object storage platform 108, metadata usable to reconstruct the metadata entries in versioned data set map 122, chunk map 124, and SUT 126 of first metadata database 120, and (2) replicating, by uploader server 506 via a hybrid "asynchronous/synchronous" approach, a transaction log of second metadata database 128 to a remote site. This hybrid asynchronous/synchronous approach can comprise "asynchronously" replicating changes to the transaction log during the majority of the snapshot upload (i.e., replicating the transaction log changes in the background, without blocking upload progress), but "synchronously" replicating final changes to the transaction log (i.e., waiting for an acknowledgement from the remote site that those final changes have been successfully replicated, before sending an acknowledgement to uploader agent 504 that the snapshot upload is complete).

Further, at the time of a failure in cloud compute and block storage platform 110 that causes metadata databases 120 and 128 to be lost, metadata recovery agent 508 can execute a metadata recovery process that involves (1) rebuilding first metadata database 120 (and constituent maps/tables 122-126) by reading the log segments stored in cloud object storage platform 108 and extracting the metadata included in each log segment, and (2) rebuilding second metadata database 128 by retrieving the replicated translation log from the remote site and replaying the transaction log.

With the general techniques above, COS-DB system 502 can efficiently recover the contents of metadata databases 120 and 128 in cloud compute and block storage platform 110, thereby addressing the durability concerns of platform 110. For example, by incorporating appropriate metadata information in each log segment uploaded in cloud object storage platform 108, COS-DB system 502 can reconstruct databases 120 and 128 directly from those log segments. And by employing the hybrid asynchronous/synchronous approach noted above for replicating the transaction log of second metadata database 128 to a remote site, COS-DB system 502 can carry out this replication in a manner that (1) has relatively low performance impact (because there is no need to wait for the remote transaction log to be updated each time the local transaction log is updated during the snapshot upload), and (2) is crash consistent (because by synchronizing the completion of snapshot upload to the completion of transaction log replication, the snapshot metadata maintained by uploader agent 504 at source data center 104 will not be discarded before the transaction log is fully replicated).

In addition, the foregoing techniques can advantageously enable the implementation of new metadata designs/schemas for databases 120 and 128 in a seamless manner. For example, if a new metadata design/schema is desired for versioned data set map 122, chunk map 124, and/or SUT 126 of first metadata database 120, new versions of those maps/tables can be constructed from the log segments in cloud object storage platform 108, without affecting the operation of existing maps/tables 122-126. Then, once the construction of those new versions is complete, COS-DB system 502 can simply switch over to using the new maps/tables.

It should be appreciated that FIG. 5 is illustrative and not intended to limit embodiments of the present disclosure. For example, although FIG. 5 depicts a particular arrangement of entities/components within operating environment 500 and COS-DB system 502, other arrangements are possible (e.g., the functionality attributed to one entity/component may be split into multiple entities/components, certain entities/components may be combined, etc.). In addition, each entity/component may include sub-components or implement functionality that is not specifically described. One of ordinary skill in the art will recognize other variations, modifications, and alternatives.

4. Enhanced Snapshot Upload Workflow

Figure 6:
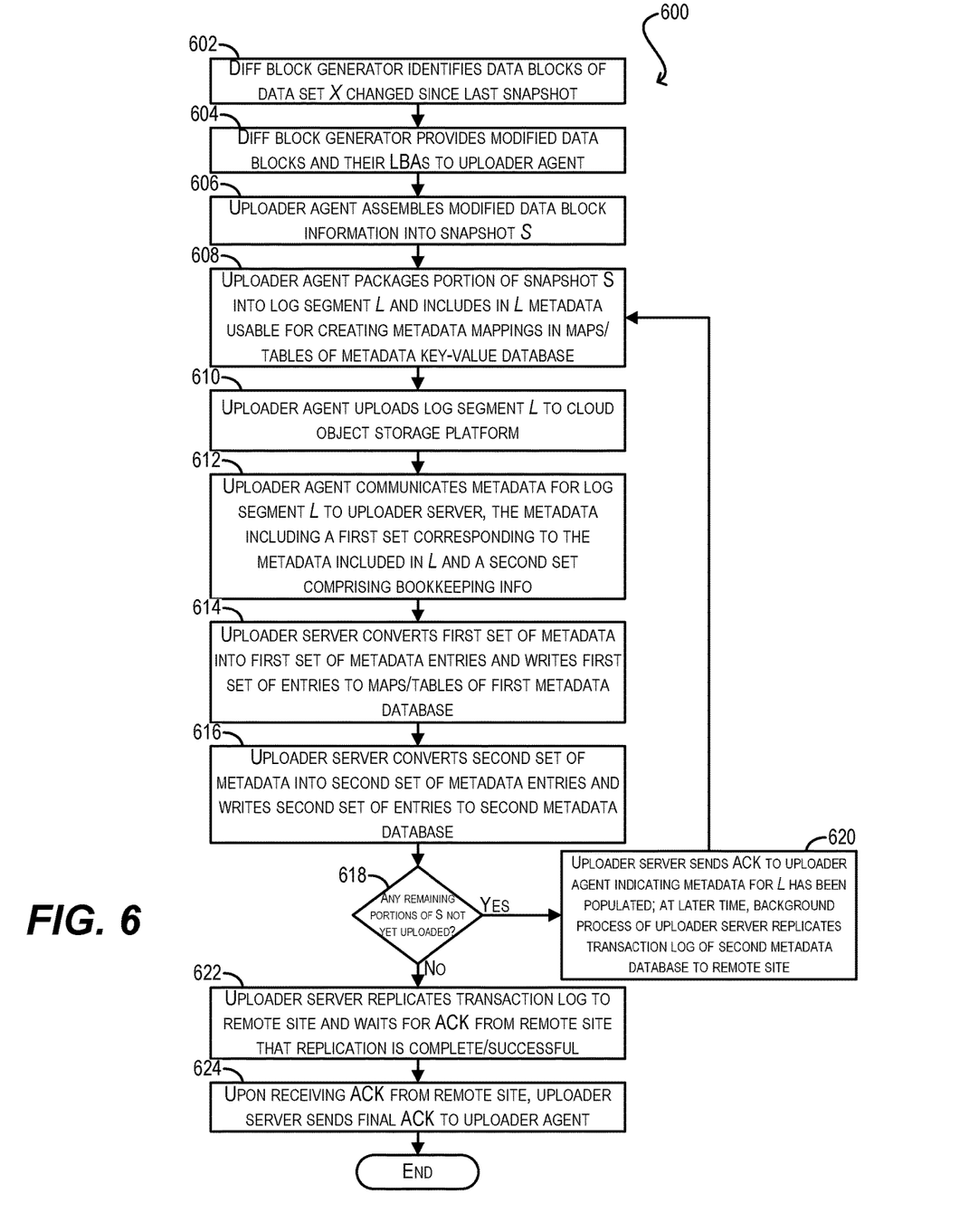
FIG. 6 depicts an enhanced snapshot upload workflow according to certain embodiments.

FIG. 6 depicts an enhanced version of workflow 200 of FIG. 2 (i.e., workflow 600) that can be executed by diff block generator 112, uploader agent 504, and uploader server 506 of FIG. 5 for uploading a given snapshot S of data set X to cloud object storage platform 108 in accordance with the metadata recovery techniques of the present disclosure. Workflow 600 assumes that second metadata database 128 in cloud compute and block storage platform 110 implements a transaction log (sometimes referred to as a "recovery log" or "binary log") that records historical transactions applied to database 128 and can be replayed to rebuild the contents of database 128 in the case of a crash or other failure.

Starting with steps 602 and 604, diff block generator 112 can identify data blocks in data set X that have changed since the creation/upload of the last snapshot for X and can provide these modified data blocks, along with their LBAs, to uploader agent 504. In the case where no snapshot has previously been created/uploaded for data set X, diff block generator 112 can provide all data blocks of X to uploader agent 504 at step 604.

At step 606, uploader agent 504 can receive the data block information from diff block generator 112 and assemble it into a snapshot S composed of, e.g., <LBA, data block> tuples. Uploader agent 504 can then package a portion of snapshot S into a log segment L (step 608) and upload L to cloud object storage platform 108 (step 210). Significantly, as part of packaging step 608, uploader agent 504 can include metadata in L that is usable for creating corresponding metadata entries in versioned data set map 122, chunk map 124, and SUT 126 of first metadata database 120. For example, uploader agent 504 can include in L the ID of data set X (i.e., the data set being backed up via L), the ID of L, and the LBA, snapshot ID, and chunk ID of each data block in L.

Upon (or concurrently with) uploading log segment L at step 610, uploader agent 504 can communicate metadata pertaining to L to uploader server 506 (step 612). This metadata can include a first set of metadata that similar/identical to the metadata incorporated into L at step 608 and a second set of metadata comprising bookkeeping information such as user authentication information, an upload timestamp of S, and so on.

In response, uploader server 506 can convert the first set of metadata into a first set of metadata entries that conform to the schemas of versioned data set map 122, chunk map 124, and SUT 126 and can write the first set of entries to these maps/tables (step 614). Uploader server 506 can also convert the second set of metadata into a second set of metadata entries that conform to the schema of second metadata database 128 and write the second set of entries to database 128 (step 616).

At step 618, uploader server 506 can check whether there are any remaining portions of snapshot S that have not been uploaded yet. If the answer is yes, uploader server 506 can return an acknowledgement to uploader agent 504 that metadata databases 120 and 128 have been updated with the metadata for log segment L (step 620), thereby causing workflow 600 to return to step 608 (so that uploader agent 504 can package the next portion of S into a new log segment for uploading). After sending this acknowledgement, a background process of uploader server 506 can, at some later time, replicate changes in the transaction log of second metadata database 128 caused by the updating of database 128 at step 616 to a remote site.

However, if the answer at step 618 is no, uploader server 506 can replicate all of the remaining changes in the transaction log to the remote site (i.e., all of the changes that have not yet been replicated) and wait for an acknowledgement from the remote site that the replication is complete/successful (step 622). In this way, uploader server 506 can ensure that the copy of the transaction log at the remote site is consistent with the copy in cloud compute and block storage platform 110. Upon receiving this acknowledgment from the remote site, uploader server 506 can return a final acknowledgement to uploader agent 504 that the upload of snapshot S and its metadata is complete (step 624) and workflow 600 can end.

5. Metadata Recovery Workflow

Figure 7:
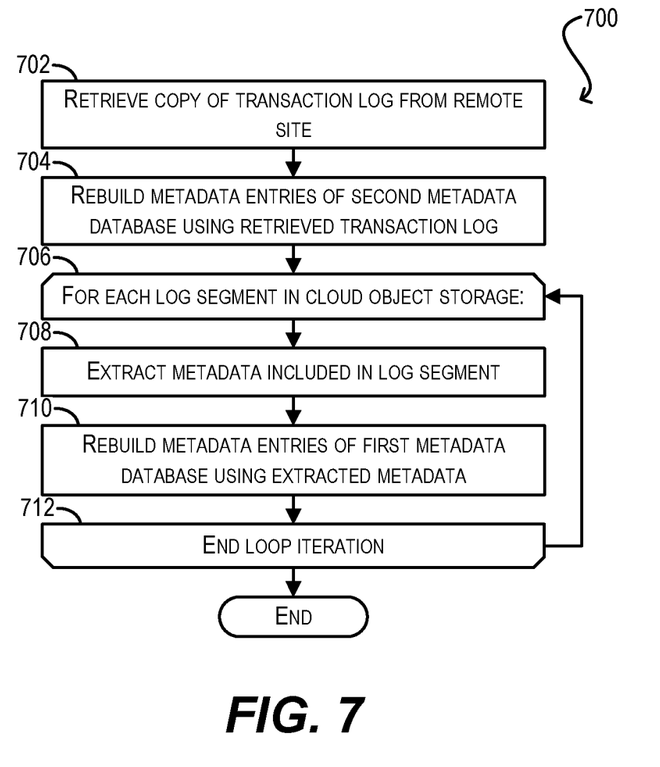
FIG. 7 depicts a metadata recovery workflow according to certain embodiments.

FIG. 7 depicts a workflow 700 that can be executed by metadata recovery agent 508 of FIG. 5 for recovering metadata databases 120 and 128 in cloud compute and block storage platform 110 in the scenario where these databases (or portions thereof) are lost due to a failure. Workflow 700 assumes that the snapshots/log segments to which the metadata in databases 120 and 128 pertain are accessible via cloud object storage platform 108.

Starting with steps 702 and 704, metadata recovery agent 508 can retrieve the copy of the transaction log of second metadata database 128 maintained at the remote site and can rebuild the metadata entries of database 128 by replaying the retrieved transaction log.

At step 706, metadata recovery agent 508 can enter a loop for each log segment maintained in cloud object storage platform 108. Within this loop, metadata recovery agent 508 can extract the metadata included in the log segment per step 608 of workflow 600 (step 708). As mentioned previously, this metadata can include the data set ID, snapshot ID, LBA, and chunk ID of each data block included in the log segment, the ID of the log segment itself, and so on.

At step 710, metadata recovery agent 508 can rebuild the metadata entries of the maps/tables in first metadata database 120 (i.e., versioned data set map 122, chunk map 124, and SUT 126) using the log segment metadata extracted at step 708. For example, with respect to versioned data set map 122, metadata recovery agent 508 can create, for each data block in the log segment, an entry in map 122 mapping the data block's data set ID, snapshot ID, and LBA to its chunk ID. Further, with respect to chunk map 124, metadata recovery agent 508 can create, for each data block in the log segment, an entry in map 124 mapping the data block's chunk ID to the log segment ID.

Finally, at step 712, metadata recovery agent 508 can reach the end of the current loop iteration and return to step 706 to process additional log segments. Once all of the log segments in cloud object storage platform 108 have been processed, workflow 700 can end.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
    creating, by a computer system, a snapshot of a data set, the snapshot including a plurality of data blocks of the data set that have been modified since creation of a prior snapshot of the data set;
    uploading, by the computer system, the snapshot to a cloud object storage platform of a cloud infrastructure, wherein the snapshot is uploaded as a plurality of log segments conforming to an object format of the cloud object storage platform, and wherein each log segment includes:
        one or more data blocks in the plurality of data blocks; and
        a first set of metadata comprising an identifier of the log segment and, for each of the one or more data blocks, an identifier of the data set, an identifier of the snapshot, a logical block address (LBA) of the data block, and a chunk identifier of the data block; and
    communicating, by the computer system, the first set of metadata to a server component running in a cloud compute and block storage platform of the cloud infrastructure,
    wherein upon receiving the first set of metadata, the server component of the cloud compute and block storage platform converts the first set of metadata into a first plurality of entries of a first metadata table for the data set and a second plurality of entries of a second metadata table for the data set,
    wherein each entry in the first plurality of entries corresponds to a data block in the plurality of data blocks and maps the identifier of the snapshot, the identifier of the data set, and the LBA of the data block to the chunk identifier of the data block, and
    wherein each entry in the second plurality of entries corresponds to a data block in the plurality of data blocks and maps the chunk identifier of the data block to the identifier of the log segment.

2. The method of claim 1 wherein, upon receiving converting the first set of metadata, the server component:
    writes the first and second metadata tables to a first metadata database in the cloud compute and block storage platform.

3. The method of claim 2 wherein, at a time of a failure in the cloud compute and block storage platform that causes contents of the first metadata database to become lost, a metadata recovery component:
    reads the plurality of log segments from the cloud object storage platform;
    extracts the first set of metadata included in each log segment; and
    rebuilds the contents of the first metadata database using the first set of metadata extracted from each log segment.

4. The method of claim 1 further comprising:
    communicating, to the server component for each of the plurality of log segments, a second set of metadata pertaining to the log segment, the second set of metadata being distinct from the first set of metadata.

5. The method of claim 4 wherein, upon receiving the second set of metadata, the server component:
    converts the second set of metadata into one or more metadata entries conforming to a schema of a second metadata database in the cloud object storage platform;
    writes the one or more metadata entries to the second metadata database; and
    determines whether any remaining portions of the snapshot have not yet been uploaded.

6. The method of claim 5 wherein if the server component determines that one or more remaining portions of the snapshot have not yet been uploaded, the server component:

transmits an acknowledgment to the computer system indicating that the second set of metadata has been populated in the second metadata database; and at a later time, replicates a transaction log of the second metadata database to a remote site; and wherein if the server component determines that all remaining portions of the snapshot have been uploaded, the server component:

replicates the transaction log to the remote site;

waits for an acknowledgment from the remote site that the transaction log has been successfully replicated; and upon receiving the acknowledgement from the remote site, transmits a final acknowledgement to the computer system.

7. The method of claim 6 wherein, at a time of a failure in the cloud compute and block storage platform that causes contents of the second metadata database to become lost, a metadata recovery component:

retrieves the transaction log from the remote site; and rebuilds the contents of the second metadata database by replaying the retrieved transaction log.

8. A non-transitory computer readable storage medium having stored thereon program code executable by a computer system, the program code embodying a method comprising:

creating a snapshot of a data set, the snapshot including a plurality of data blocks of the data set that have been modified since creation of a prior snapshot of the data set;

uploading the snapshot to a cloud object storage platform of a cloud infrastructure, wherein the snapshot is uploaded as a plurality of log segments conforming to an object format of the cloud object storage platform, and wherein each log segment includes:

one or more data blocks in the plurality of data blocks; and a first set of metadata comprising an identifier of the log segment and, for each of the one or more data blocks, an identifier of the data set, an identifier of the snapshot, a logical block address (LBA) of the data block, and a chunk identifier of the data block; and communicating the first set of metadata to a server component running in a cloud compute and block storage platform of the cloud infrastructure, wherein upon receiving the first set of metadata, the server component of the cloud compute and block storage platform converts the first set of metadata into a first plurality of entries of a first metadata table for the data set and a second plurality of entries of a second metadata table for the data set, wherein each entry in the first plurality of entries corresponds to a data block in the plurality of data blocks and maps the identifier of the snapshot, the identifier of the data set, and the LBA of the data block to the chunk identifier of the data block, and wherein each entry in the second plurality of entries corresponds to a data block in the plurality of data blocks and maps the chunk identifier of the data block to the identifier of the log segment.

9. The non-transitory computer readable storage medium of claim 8 wherein, upon converting the first set of metadata, the server component:

writes the first and second metadata tables to a first metadata database in the cloud compute and block storage platform.

10. The non-transitory computer readable storage medium of claim 9 wherein, at a time of a failure in the cloud compute and block storage platform that causes contents of the first metadata database to become lost, a metadata recovery component:

reads the plurality of log segments from the cloud object storage platform;

extracts the first set of metadata included in each log segment; and rebuilds the contents of the first metadata database using the first set of metadata extracted from each log segment.

11. The non-transitory computer readable storage medium of claim 8 wherein the method further comprises:

communicating, to the server component for each of the plurality of log segments, a second set of metadata pertaining to the log segment, the second set of metadata being distinct from the first set of metadata.

12. The non-transitory computer readable storage medium of claim 11 wherein, upon receiving the second set of metadata, the server component:

converts the second set of metadata into one or more metadata entries conforming to a schema of a second metadata database in the cloud object storage platform;

writes the one or more metadata entries to the second metadata database; and determines whether any remaining portions of the snapshot have not yet been uploaded.

13. The non-transitory computer readable storage medium of claim 12 wherein if the server component determines that one or more remaining portions of the snapshot have not yet been uploaded, the server component:

transmits an acknowledgment to the computer system indicating that the second set of metadata has been populated in the SQL database; and at a later time, replicates a transaction log of the second metadata database to a remote site; and wherein if the server component determines that all remaining portions of the snapshot have been uploaded, the server component:

replicates the transaction log to the remote site;

waits for an acknowledgment from the remote site that the transaction log has been successfully replicated; and upon receiving the acknowledgement from the remote site, transmits a final acknowledgement to the computer system.

14. The non-transitory computer readable storage medium of claim 13 wherein, at a time of a failure in the cloud compute and block storage platform that causes contents of the second metadata database to become lost, a metadata recovery component:

retrieves the transaction log from the remote site; and rebuilds the contents of the second metadata database by replaying the retrieved transaction log.

15. A computer system comprising:

a processor; and a non-transitory computer readable medium having stored thereon program code that, when executed, causes the processor to:

create a snapshot of a data set, the snapshot including a plurality of data blocks of the data set that have been modified since creation of a prior snapshot of the data set;

upload the snapshot to a cloud object storage platform of a cloud infrastructure, wherein the snapshot is uploaded as a plurality of log segments conforming to an object format of the cloud object storage platform, and wherein each log segment includes:
one or more data blocks in the plurality of data blocks; and
a first set of metadata comprising an identifier of the log segment and, for each of the one or more data blocks, an identifier of the data set, an identifier of the snapshot, a logical block address (LBA) of the data block, and a chunk identifier of the data block; and
communicate the first set of metadata to a server component running in a cloud compute and block storage platform of the cloud infrastructure,
wherein upon receiving the first set of metadata, the server component of the cloud compute and block storage platform converts the first set of metadata into a first plurality of entries of a first metadata table for the data set and a second plurality of entries of a second metadata table for the data set,
wherein each entry in the first plurality of entries corresponds to a data block in the plurality of data blocks and maps the identifier of the snapshot, the identifier of the data set, and the LBA of the data block to the chunk identifier of the data block, and
wherein each entry in the second plurality of entries corresponds to a data block in the plurality of data blocks and maps the chunk identifier of the data block to the identifier of the log segment.

16. The computer system of claim 15 wherein, upon converting the first set of metadata, the server component:
writes the first and second metadata tables to a first metadata database in the cloud compute and block storage platform.

17. The computer system of claim 16 wherein, at a time of a failure in the cloud compute and block storage platform that causes contents of the key-value database to become lost, a metadata recovery component:
reads the plurality of log segments from the cloud object storage platform;
extracts the first set of metadata included in each log segment; and
rebuilds the contents of the first metadata database using the first set of metadata extracted from each log segment.

18. The computer system of claim 15 wherein the program code further causes the processor to:
communicate, to the server component for each of the plurality of log segments, a second set of metadata pertaining to the log segment, the second set of metadata being distinct from the first set of metadata.

19. The computer system of claim 18 wherein, upon receiving the second set of metadata, the server component:
converts the second set of metadata into one or more metadata entries conforming to a schema of a second metadata database in the cloud object storage platform;
writes the one or more metadata entries to the second metadata database; and
determines whether any remaining portions of the snapshot have not yet been uploaded.

20. The computer system of claim 19 wherein if the server component determines that one or more remaining portions of the snapshot have not yet been uploaded, the server component:
transmits an acknowledgment to the computer system indicating that the second set of metadata has been populated in the second metadata database; and
at a later time, replicates a transaction log of the second metadata database to a remote site; and
wherein if the server component determines that all remaining portions of the snapshot have been uploaded, the server component:
replicates the transaction log to the remote site;
waits for an acknowledgment from the remote site that the transaction log has been successfully replicated; and
upon receiving the acknowledgement from the remote site, transmits a final acknowledgement to the computer system.

21. The computer system of claim 20 wherein, at a time of a failure in the cloud compute and block storage platform that causes contents of the second metadata database to become lost, a metadata recovery component:
retrieves the transaction log from the remote site; and
rebuilds the contents of the second metadata database by replaying the retrieved transaction log.

* * * * *